United States Patent Office 3,361,071
Patented Jan. 2, 1968

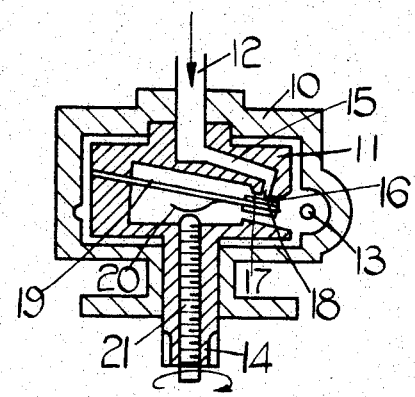

3,361,071
CENTRIFUGAL LIQUID PUMPS
Geoffrey Arthur Lewis, Solihull, England, assignor to Joseph Lucas (Industries) Limited, Birmingham, England
Filed Feb. 21, 1967, Ser. No. 617,609
Claims priority, application Great Britain, Feb. 24, 1966, 8,132/66
2 Claims. (Cl. 103—97)

ABSTRACT OF THE DISCLOSURE

A liquid pump has a body within which is a rotor, there being an off-set inlet passage through the rotor and an outlet in the body, the escape of liquid through the orifice at the end of the passage being controlled by a speed responsive valve closure member mounted upon the rotor.

This invention relates to liquid pumps, referred to as being of the kind specified, having a body, a rotor mounted within a cavity in the body, an inlet communicating with a passage in the rotor, and an outlet in the body spaced from the axis, the rotor having a passage for liquid extending from a position in communication with said inlet to a position off-set from the rotor axis.

In pumps of this as well as other kinds, in order that the delivery of liquid shall be controlled in accordance with speed, there has been provided a valve which is operable in response to speed to control the flow of liquid through the pump.

The object of the invention is to provide a pump of the kind specified in which the delivery is dependent upon the speed of rotation of the rotor.

In accordance with the present invention a pump of the kind specified is characterized in that the passage within the rotor communicating with the inlet terminates at its end remote from the inlet in an orifice, the rotor carrying a valve closure member the position of which determines the flow of liquid through the orifice in accordance with the speed of rotation of the rotor.

The invention will now be described by way of example with reference to the accompanying drawing which shows diagrammatically a pump constructed in accordance with this invention.

The pump shown is particularly useful for the supply of liquid fuel to an internal combustion engine of the gas turbine type and comprises a body 10 within which is mounted a rotor 11, the body 10 having an inlet passage 12 at or near the axis of rotation of the rotor 11, and an outlet passage 13 which is disposed beyond the edge of the rotor 11 and is disposed at the end of a volute formed in the cavity formed within the body 10. The rotor 11 is mounted upon a shaft 14 which is adapted to be driven by an engine to which the pump is intended to supply fuel.

Within the rotor 11 is formed a substantially radial passage 15 communicating at its inner end with the inlet 12 and terminating at an orifice 16 which is disposed near the edge of the rotor 11. Surrounding the orifice 16 is a seating 17 engageable by a valve closure member 18 carried on an arm 19 which in turn is secured in the rotor 11 at the side of the axis of rotation remote from the orifice 16. The valve closure member is movable in response to the speed of rotation of the rotor under centrifugal action by being mounted in its rest position as illustrated at an angle which is inclined to the axis of rotation of the rotor 11. In order to control the movement of the valve closure member 18 there is a blade spring 20 which engages at the end of its travel against an adjusting screw 21 mounted within the shaft 14 of the rotor 11.

With increasing speed of rotation of the rotor 11 the valve closure member 18 is moved progressively towards the seating 17 to limit the quantity of fuel passing through the orifice 16, and flowing to the outlet 13 in the body 10. The stiffness of the member 19 is so calculated that the flow of fuel is substantially unrestricted until a predetermined speed range is reached, whereupon the valve closure member will move progressively towards the seating 17.

Having thus described my invention what I claim as new and desire to secure by Letters Patent is:

1. A pump comprising a body, a rotor rotatably mounted within the body about an axis, the body having an inlet and an outlet for liquid to be pumped, the inlet being nearer to the axis of rotation of the rotor than the outlet, the rotor having a passage communicating at one end with the inlet in the body, and at the other end said passage terminates at a position off-set from the axis of rotation of the rotor, and a member carried by the rotor and connected to it at a position off-set from the axis of rotation thereof, said member being so disposed that, in use, with increasing speed of rotation of the rotor, the member is moved, under the action of centrifugal force, towards the termination of the passage in the rotor to restrict flow of liquid therethrough.

2. A pump as claimed in claim 1 in which the member has a stiffness which is such that, in use, movement of the member towards said passage termination will only begin when a predetermined speed is reached.

References Cited
UNITED STATES PATENTS

| | | | |
|---|---|---|---|
| 949,215 | 2/1910 | Burrell | 103—100 |
| 959,089 | 5/1910 | Wickblom | 103—100 |
| 975,232 | 11/1910 | Hanes et al. | 103—100 |

HENRY F. RADUAZO, Primary Examiner.